United States Patent Office 3,176,925
Patented Apr. 6, 1965

3,176,925
PROCESS FOR MANUFACTURE OF FINELY DIVIDED PIGMENTS
Eric Reginald Huband and John Mitchell, Manchester, England, assignors to Imperial Chemical Industries Limited, London, England, a corporation of Great Britain
No Drawing. Filed Aug. 6, 1962, Ser. No. 214,849
Claims priority, application Great Britain, Aug. 30, 1961, 31,225/61
5 Claims. (Cl. 241—16)

This invention relates to a process for the manufacture of finely divided solids, particularly colouring matters such as pigments.

It is known that solids, particularly colouring matters such as pigments may be obtained in finely divided state by the salt-milling technique, in which a solid is milled with a solid inorganic substance such as sodium chloride or calcium carbonate, hard objects such as steel balls and iron nails being usually used as grinding aids. The inorganic material is subsequently removed from the finely divided solid by extraction with water or dilute acid or alkali.

It is also known that solids may be obtained in finely divided state by viscous-milling or plastic milling a mixture of the solid with inorganic material and sufficient organic liquid to provide a shearable magma, and subsequently removing the inorganic material by extraction with water or dilute acid or alkali.

According to the present invention a process for reducing the particle size of a pulverisable solid comprises agitating said solid with inorganic material which is subsequently removable by extraction with water or dilute acid or alkali, and an organic liquid which is virtually a non-solvent for said solid and inorganic material, the quantity of said organic liquid being sufficient to provide a fluid mixture.

The process of the invention may be used to reduce the particle size of all kinds of pulverisable solids, for example medicinal and horticultural products and organic and inorganic colouring matters such as dyes, particularly vat and disperse dyes, and pigments. The process is of especial value when used to reduce the particle size of pigments.

All types of pigments may be obtained in finely divided state by means of the process of the invention, including inorganic pigments such as iron oxide, cadmium sulphide and Prussian blue, and organic pigments, for example of the azo-, anthraquinone and other polycyclic series, or the phthalocyanine or other heterocyclic series.

The inorganic material used in the process of the invention is preferably a water-soluble salt such as sodium chloride or sodium sulphate but a water-insoluble substance such as an oxide or carbonate, for example calcium oxide or carbonate, may be used, such substances being readily soluble in dilute acids such as hydrochloric acid.

The organic liquid used in the process of the invention is preferably one having a boiling point between about 50° and about 200° C. and is preferably also one which is easily removable from the finely divided pigment, for example by being miscible with water. Suitable liquids include ethanol, acetone and ethylene glycol monomethyl and monoethyl ethers, and especially methanol.

By the expression "virtually a non-solvent" we mean that the organic liquid does not dissolve more than about 5% of the solid and inorganic material. For example we find that methanol may be used in combination with ammonium chloride although it is soluble to the extent of about 3% at ordinary temperature. In such cases the liquid in which agitation takes place to reduce the particle size is actually a saturated solution of the inorganic material in the organic liquid.

The proportions of pulverisable solid inorganic substance and organic liquid used in the process of the invention are not critical, so long as sufficient organic liquid is used to provide a mixture which becomes fluid when agitated. It is convenient to use from 4 to 20 parts by weight of inoragnic material for each part by weight of pulverisable solid, and the weight of organic liquid used may conveniently be about from half to twice the weight or inorganic material.

We find that it is advantageous to carry out the process of the invention in a cylindrical vessel fitted with a stirrer comprising a centrally located rotatable shaft carrying one or more discs affixed centrally to the shaft with their main plane at right angles to the shaft. In such a vessel excellent results are obtained by agitating vigorously (for example at about 500 to 4000 revolutions per minute) for about ½ to 3 hours depending upon the nature of the pulverisable solid and inorganic material used. The apparatus may be arranged for continuous operation, for example by pumping a mixture of pulverisable solid, inorganic material and organic liquid into the vessel through an inlet tube in the lower part of the vessel, and allowing the mixture to issue, after agitation from an outlet tube situated near the top of the vessel.

After carrying out the process of the invention the finely divided solid may be isolated by treating the mixture with water, dilute acid or alkali to dissolve the inorganic material and filtering off the residual solid from the mixture of liquids, washing and drying. Alternatively, if desired, some or all of the organic liquid may be distilled off from the mixture before treatment with water, dilute acid or alkali.

The process of our invention has certain similarities to the known process in which the particle size of a pulverisable solid is reduced by agitation with a liquid and insoluble particulate grinding elements such as sand. Our process has operational advantages over the known process because it is not necessary to screen the resultant finely divided suspension of pulverisable solid to remove the sand or other particles. Such screening is usually accomplished by incorporating a gauze filter in a continuously operating milling apparatus so that the sand is retained. This places a severe limitation upon the speed at which it is possible to pass material through the mill, and also necessitates the use of fairly large amounts of liquid. When our process is operated continuously the whole of the material, including the inorganic material which acts as grinding aid passes through the mill. There is no screening problem and we are enabled to use quite small amounts of liquid. This reduces the expenses of solvent recovery, and by producing a thicker mass of material to be agitated, results in more efficient milling and greater and more efficient reduction in particle size.

Finely divided pigments obtained by the process of the invention have exceptionally high tinctorial strengths and are highly suitable for incorporation in alkyd resin paints because only a short grinding time is required.

The invention is illustrated but not limited by the following examples in which the parts are by weight and the abbreviation C.I. refers to Colour Index, Second Edition, published jointly by the Society of Dyers and Colourists and the American Association of Textile Chemists and Colorists.

*Example 1*

65.0 parts of methanol and 100 parts of anhydrous sodium sulphate are placed in a water-cooled cylindrical container fited with a high speed stirrer comprising a central shaft with 3 discs at right angles to the shaft. The mixture is stirred rapidly for 5 minutes and 8.0 parts of 8:18-dichloro-5:15-diethyl-di-indolo(3,2-b,3',2-m) - 5:15-dihydrotriphendioxazine (obtained by condensing 2 moles of 3-amino-9-ethylcarbazole with 1 mole of chloranil in o-dichlorobenzene, adding benzenesulphonchloride and heating) is added. Stirring is continued for 60 minutes at a speed of 3,300 revolutions per minute, and the mixture is then poured into 1,250 parts of water, at 60° C. The resulting pigment suspension is stirred and heated to 60° C. for 30 minutes and the pigment is filtered off, washed with water until free of electrolyte and dried at 70° C. Microscopic examination shows the dried product to consist of easily dispersed aggregates of particles, the aggregates being about 1 to 4 microns in diameter. The surface area of the product, as determined by low temperature nitrogen adsorption is 66 square metres per gram.

The product may readily be incorporated in alkyd resin paints, maximum shade and strength being obtained with only a very short period of grinding. A corresponding pigment obtained by a salt-milling procedure required a longer period of grinding to obtain a paint of maximum shade and strength.

If, in place of anhydrous sodium sulphate in this example, sodium metabisulphite is used the pigment has a surface area of 57.5 square metres per gram.

If ethylene glycol monoethyl ether is used in place of methanol the pigment has a surface area of 43 square metres per gram.

*Example 2*

In place of 8:18-dichloro-5:15-diethyl-di-indolo(3,2-b,3',2-m)5:15-dihydrotriphendioxazine in Example 1 there may be used any of the following pigments:

Copper phthalocyanine
A copper chloro phthalocyanine containing about 4% of chlorine
Copper hexadecachlorophthalocyanine
Copper octabromooctachlorophthalocyanine
Copper tetrabromododecachlorophthalocyanine
Monolite Fast Red 2G (C.I. Pigment Orange 5)
Dibromoanthanthrone
Monolite Fast Bordeaux ZR (C.I. Pigment Red 12)
Monolite Fast Blue 3R (C.I. Vat Blue 20)
Monolite Fast Yellow FR (C.I. Vat Yellow 1)
1:1'::5:1''-trianthrimide
Linear quinacridone
Ferric oxide
Pure Lemon Chrome L3G (C.I. Pigment Yellow 34)
Monolite Maroon M (C.I. Pigment Red 18)
Tetrachlorothioindigo In each case the products may readily be incorporated in alkyd resin paints, the time of grinding required to produce maximum shade and strength being less than that required by the corresponding pigment obtained by a salt-milling procedure, or by any other known procedure for reducing the particle size of a pulverisable solid.

The above examples illustrate the use, in the process of the invention, of anhydrous sodium sulphate as the inorganic material. In place of sodium sulphate in these examples the following water-soluble inorganic salts may be employed:

Sodium chloride
Sodium metabisulphite
Sodium thiosulphate
Ammonium chloride
Glauber's salt
Ammonium carbonate
Sodium bisulphate
Magnesium sulphate
Potash Alum
Potassium chloride We have found that the best results are obtained using sodium chloride (especially in dendritic, granular and ordinary cubic forms), ammonium chloride, potash alum, potassium chloride and anhydrous sodium sulphate (especially in the forms known commercially as "Kemsol" and "hard $Na_2SO_4$").

The following organic liquids may be employed in place of methanol in the above examples:

Ethanol
Isopropanol
β-Methoxyethanol
β-Ethoxyethanol
Acetone
Nitrobenzene
Kerosene
Xylene
Trichloroethylene

We claim:
1. A process for reducing the particle size of a pulverisable solid which comprises vigorously agitating a fluid mixture consisting essentially of said pulverisable solid, a grinding aid selected from the class consisting of water-soluble inorganic salts and mixtures thereof as the sole grinding aid, and an organic liquid, the solubilities of said solid and said grinding aid in said liquid being less than 5% by weight.

2. Process according to claim 1 in which the pulverisable solid is a pigment.

3. Process according to claim 2 wherein the water-soluble inorganic salt is a member of the class consisting of sodium chloride, sodium metabisulphite, sodium thiosulphate, ammonium chloride, Glauber's salt, ammonium carbonate, sodium bisulphate, magnesium sulphate, potash alum, potassium chloride and anhydrous sodium sulphate.

4. Process according to claim 3 wherein the organic liquid is a member of the class consisting of methanol, ethanol, isopropanol, β-methoxyethanol, β-ethoxyethanol, acetone, nitrobenzene, kerosene, xylene and trichloroethylene.

5. Process according to claim 4 wherein there is used from 4 to 20 parts by weight of inorganic material for each part by weight of pulverisable solid and from ½ to 2 parts by weight of organic liquid for each part by weight of inorganic material.

References Cited by the Examiner
UNITED STATES PATENTS

| | | | |
|---|---|---|---|
| 2,065,762 | 12/36 | Stanley | 241—16 |
| 2,556,728 | 6/51 | Graham. | |
| 2,840,568 | 6/58 | Brouillard et al. | 241—16 X |
| 2,858,230 | 10/58 | Knoll et al. | 241—16 X |
| 2,918,465 | 12/59 | Lytle et al. | 241—16 X |
| 3,090,567 | 5/63 | Schafer et al. | 241—22 |

J. SPENCER OVERHOLSER, *Primary Examiner.*